United States Patent [19]

Loding et al.

[11] Patent Number: 4,858,424
[45] Date of Patent: Aug. 22, 1989

[54] VARIABLE RADIUS CABLE CARRIER

[75] Inventors: David C. Loding, Sandusky; James D. Ernst, Peck, both of Mich.

[73] Assignee: Magnetek Controls, Clawson, Mich.

[21] Appl. No.: 232,163

[22] Filed: Aug. 15, 1988

[51] Int. Cl.$^4$ ............................................. F16G 13/16
[52] U.S. Cl. ...................................... 59/78.1; 248/51
[58] Field of Search ..................... 59/78.1, 78; 248/51, 248/49, 52

[56] References Cited

U.S. PATENT DOCUMENTS 4,625,507 12/1986 Moritz ................................. 59/78.1

FOREIGN PATENT DOCUMENTS 1075974 7/1967 United Kingdom ................ 59/78.1

Primary Examiner—David Jones
Attorney, Agent, or Firm—Krass & Young

[57] ABSTRACT

A variable radius cable/conductor carrier for supporting and guiding electrical, hydraulic and other conductors extending between a stationary position and a movable piece of machinery. The conductor is made up of two spaced apart parallel plate-link chains connected by support rods. The link assembly making up the chains comprises a series of individual links pivotally connected at each end so as to allow rotational movement between the links. A plurality of arcuate slots are formed in one of the links and when pinned to the adjacent link act to limit the rotation between the links. The arcuate slots are of differing lengths so each length results in a different radius of curvature for the carrier. Thus one of several radii of curvature of the carrier may be selected during assembly without changing any of the elements simply by selecting the position of the limiting pin.

3 Claims, 2 Drawing Sheets

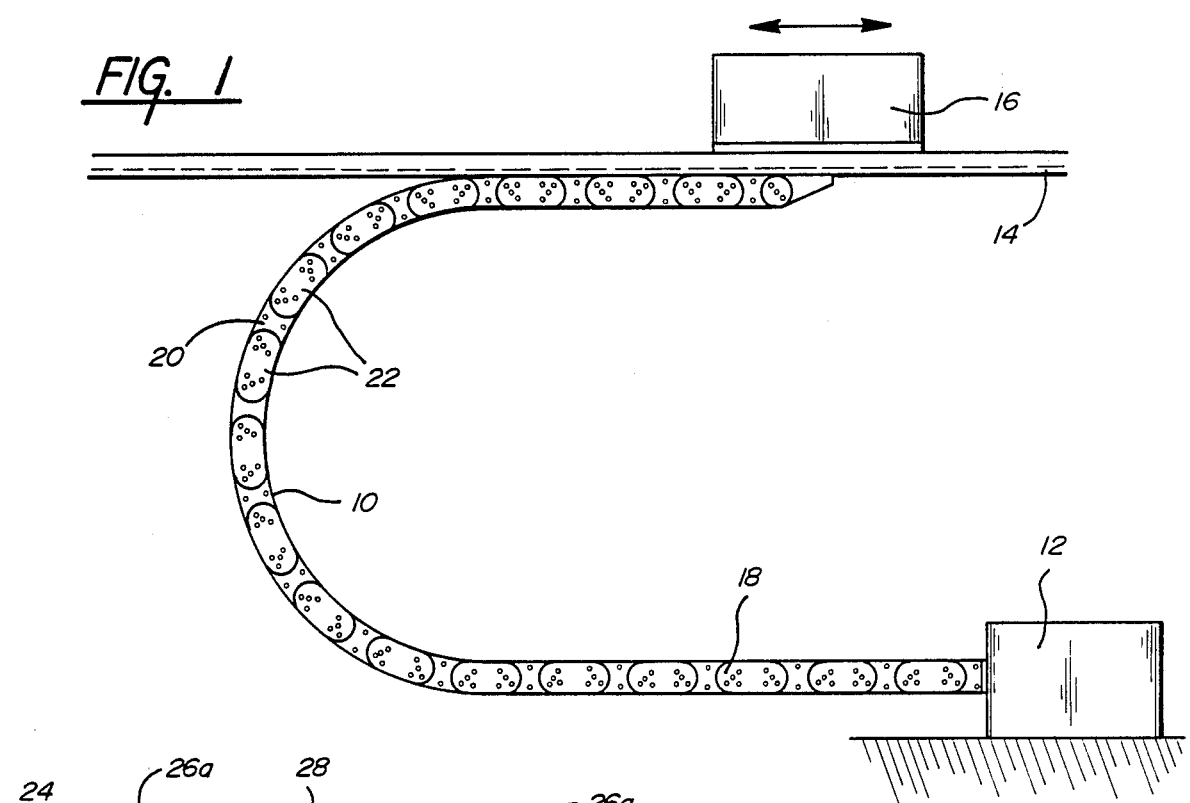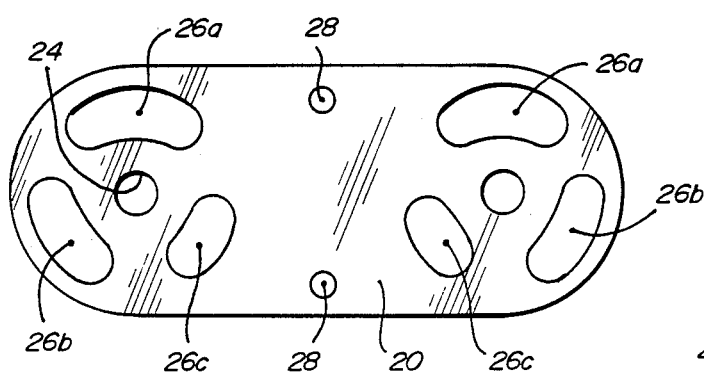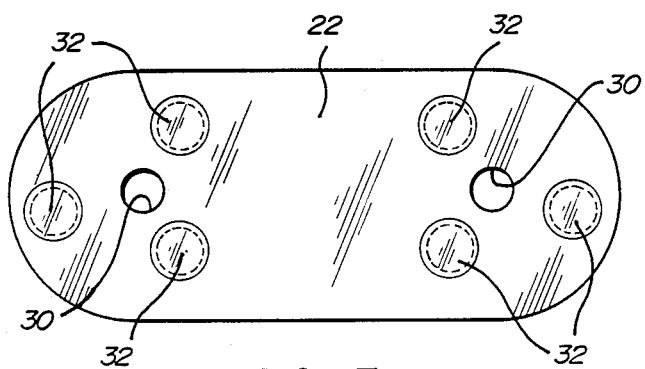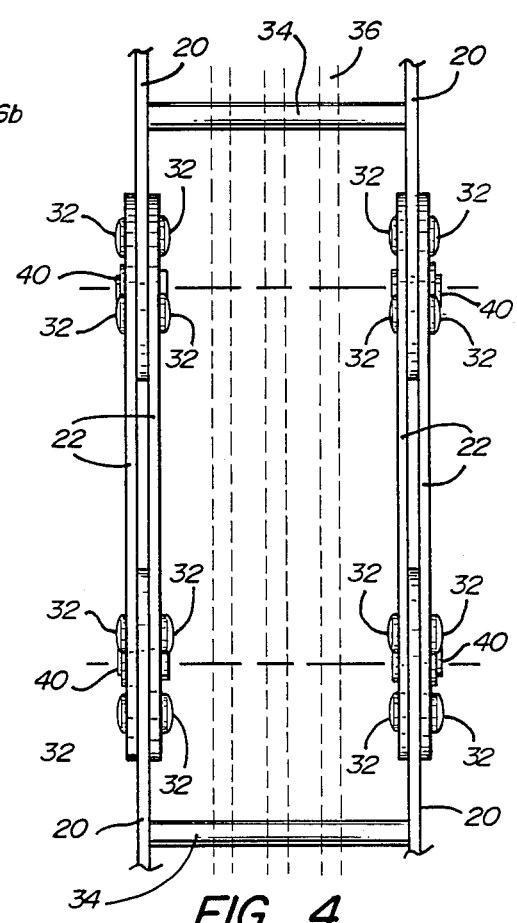

VARIABLE RADIUS CABLE CARRIER

INTRODUCTION

The subject invention relates to a rolling cable/conductor carrier used to protect, support and guide electric or hydraulic lines connected between a stationary point and a movable piece of machinery.

BACKGROUND OF THE INVENTION

Rolling cable/conductor carriers have been widely used in the industry and are well-known to the art. See U.S. Pat. Nos. 4,590,961, 3,786,670 and 3,716,986. Such cable/conductor carriers typically consist of two parallel "chains", each made up of flat metal links which are pivotally connected in overlapping end-to-end relationship. Transverse bridging pins interconnect the two chains to form a box-like serpentine structure capable of carrying cables and hoses. The carriers manage the location of the carried cables and hoses and limit the radius of any bend created therein to the minimum radius of curvature of the carrier.

This radius of curvature is mechanically determined by the structure of the carrier, and is not variable except by substitution or modification of parts during assembly.

One prior art technique for defining the radius of curvature involves the formation of a kidney-shaped slot in one of the links of each chain and the disposition in this slot of a pin carried by the overlapping link. The length of the slot determines the minimum radius of curvature for the carrier. A longer slot results in a smaller radius of curvature.

In order to create cable/conductor carriers with different radii of curvature, different elements must be used in the assembly. This results in the manufacture and storage of a multitude of dissimilar elements causing an increase in cost with respect to assembly, price and inventory.

SUMMARY OF THE INVENTION

Briefly summarized, the invention is a unique link assembly allowing for the construction of a cable/conductor carrier with multiple radii of curvature, anyone of which may be selected during assembly without changing or substituting for the elements that comprise the carrier.

In general the invention comprises a plate-link chain having pivotally connected overlapping inner and outer links wherein several arcuate slots of different lengths are located concentrically about the pivot point on the inner link, and a slug pin which extends through a selected one of the arcuate slots and is retained by the outer link thereby limiting the maximum angular relationship between the links.

A preferred commercial embodiment of the invention comprises a serpentine, box-like structure of two "chains" which, like the prior art devices, are interconnected in parallel by bridging pins and which consist of pivotally connected inner and outer links. Unlike the prior art, the inner links in each chain exhibit a plurality of slots arrayed about a common center, each slot in the arrangement having a different length representing a different, selectable minimum carrier radius curvature. Small pins, hereinafter called slugs, are placed during assembly in the desired slots and are captured by recess or pockets formed integrally in outer links which are pivotally connected to the inner links.

BRIEF DESCRIPTION OF THE DRAWING

FIG. 1 is a side view of the rolling conductor support of the present invention connected between a stationary point and a movable piece of machinery;

FIG. 2 is a side view of an inner link;

FIG. 3 is a side view of an outer link;

FIG. 4 is a top view of a portion of the conductor assembly as shown in FIG. 1;

DETAILED DESCRIPTION OF THE ILLUSTRATIVE EMBODIMENT

Figure 5:
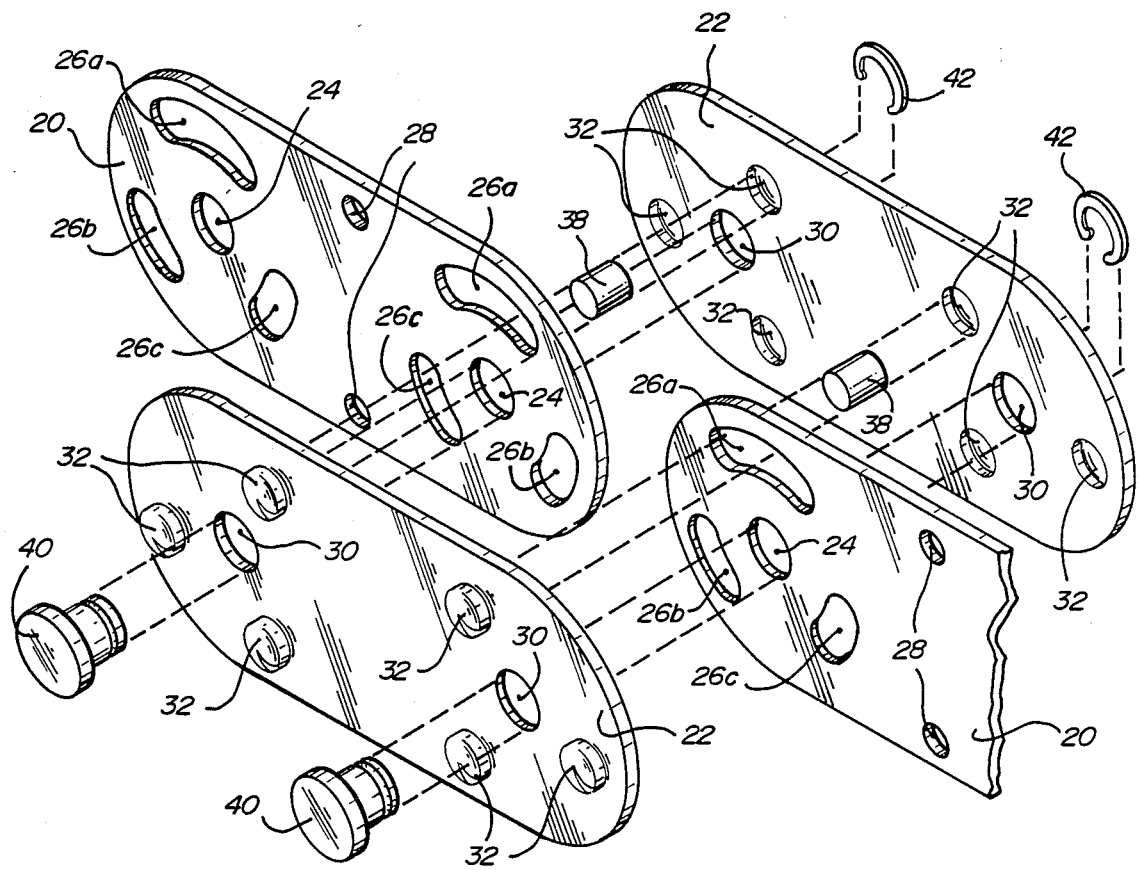
FIG. 5 is an exploded perspective view of the linkage assembly.

FIG. 1 shows an illustrative installation of a rolling cable/conductor carrier 10 attached at one end to a moving piece of machinery 16 operating on a set of rails or guides 14 and attached at the other end to a stationary piece of machinery 12 resting on the floor 18 or or a support member. The cable/conductor carrier 10 consists of a pair of narrowly spaced parallel chains consisting of inner links 20 and outer links 22.

Referring now to FIG. 2. FIG. 2 shows an inner link 20 substantially rectangular in shape having circular ends. Central apertures 24 adapted to receive pivot pins 40 are located at each end of the inner link 20 along a horizontal longitudinal center line. Three arcuate slots 26A, 26B and 26C of different lengths are arranged concentrically about the central aperture 24. When one of these is combined with a stop pin or slug 38, the arcuate slot 26A, 26B, 26C limits the rotation about the central aperture 24 as hereinafter described. The inner link 20 also contains two transverse holes 28 which are adapted to receive the support rods 34 which bridge the parallel link assemblies and are the support means for the cables or conductors.

FIG. 3 shows an outer link 22 of substantially rectangular shape with semi-circular ends having a longitudinal center line extending in the horizontal direction about which two central apertures 30 are located. Arranged concentrically about the central aperture 30 are three stamped or forged pockets 32 extending outward and perpendicular from the planar outer surface of the outer link 22. These indentations 32 are adapted to receive and retain a stop pin or slug 38.

Referring now to FIG. 5, FIG. 5 shows an exploded view of the linkage assembly. The preferred embodiment comprises an inner link 20 placed between two outer links 22, the links are connected at the respective central apertures using a pin 40 retained by a snap ring 42. In order to establish a specific radius of curvature a stop pin 38 is inserted into a selected arcuate slot 26A, and is received on both ends by the indentations 32 of the outer link 22. The pin 38 is not connected to the outer link 22 but is instead free floating and held in place by the pockets 32 of the outer link 22. Therefore, in order to change the radius of curvature the assembler need only remove the snap ring 42, enabling removal of an outer link 22 allowing the assembler to reposition the stop pin or slug 38 in a different arcuate slot 26B, 26C. The repositioning of the stop pin 38 is the means allowing a different radius of curvature to be obtained.

FIG. 4 shows a top view of the conductor support illustrating the combination of inner 20 and outer 22 links connected by the support rods 34 used to contain the cables or conductors 36. As shown in FIG. 4, each inner link 20 is connected with two separate outer links 22. The outer links 22 contain the .cp4 stop pin 38, which also extends through the inner link 20 between them.

Figure 6:
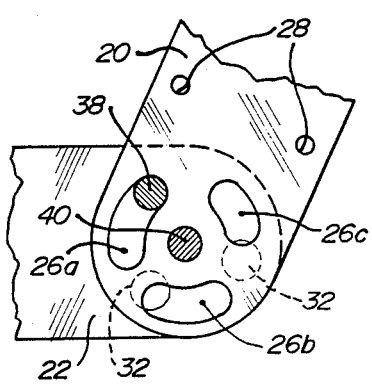
FIG. 6 is a side view in which the two links are disposed in an angular position wherein the pin restricts the rotational movement.
Figure 7:
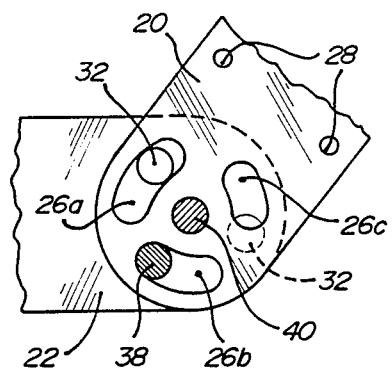
FIG. 7 is a side view similar to FIG. 6 in which the two links are disposed in an intermediate angular position.
Figure 8:
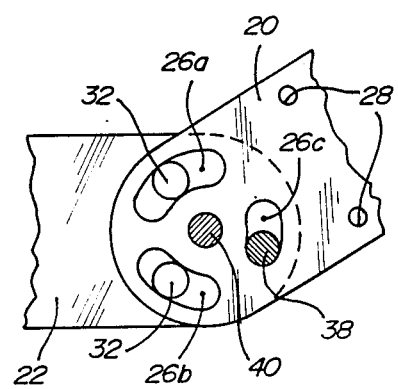
FIG. 8 is a side view similar to FIGS. 6 and 7 in which the two links are disposed in the most restrictive angular position.

FIGS. 6, 7 and 8 show an illustrative example of the radius of curvature than can be obtained when the stop pin 38 is placed in one of the arcuate slots 26A, 26B, 26C of the inner link 20. As shown in FIG. 6, the longer the arcuate slot 26A that the stop pin or slug 38 is placed in, the smaller the radius of curvature. When the stop pin or slug 38 is placed in the shortest arcuate slot length 26C the radius of curvature will then be placed at a maximum.

By using a conductor support of this type the radius of curvature of the cable/conductor carrier 10 can be varied by the assembler using the same elements, simply by varying the installed position of slug 38. The assembler need only move the stop pin or slug 38 to a different arcuate slot 26A, 26B, 26C to allow a change in the radius of curvature. This forms an improvement in that added parts are not needed to vary the conductor radius. Thus, a more economical rolling support is created allowing for a reduction in inventory and cost of manufacturing.

It is to be understood that through preferred embodiments of the present invention have been described in detail, various modifications, alterations and changes may be made without departing from the spirit and scope of the present invention as defined in the claims.

What I claim is:

1. A plate-link chain comprising:
   first and second links pivotally connected by pivots in a contiguous overlapping relationship forming a chain;
   a plurality of arcuate slots on said first link arranged concentrically about the pivots, said slots being of different lengths; and
   a slug pin fixed to said second link and extending through a particular arcuate slot,
   whereby the pin limits the maximum angular travel between the links.

2. A chain according to claim 1 comprising parallel pairs of said second links spaced apart to receive single first links in overlapping relation therebetween; each of said second links having plural pockets formed therein concentrically about said pivots to receive and hold said pin within a slot.

3. A conductor support comprising two parallel chains constructed according to claim 2, further including bridging pins securing said chains together.

* * * * *